(12) United States Patent
Vilsboll

(10) Patent No.: US 6,609,889 B1
(45) Date of Patent: Aug. 26, 2003

(54) METHOD AND A DEVICE FOR ADJUSTING THE PITCH AND STOPPING THE ROTATION OF THE BLADES OF A WIND TURBINE

(75) Inventor: Niels Vilsboll, Thy (DK)

(73) Assignee: NEG Micon A/S, Randers (DK)

( * ) Notice: Subject to any disclaimer, the term of this patent is extended or adjusted under 35 U.S.C. 154(b) by 0 days.

(21) Appl. No.: 09/762,814
(22) PCT Filed: Aug. 13, 1999
(86) PCT No.: PCT/DK99/00433
§ 371 (c)(1),
(2), (4) Date: Apr. 16, 2001
(87) PCT Pub. No.: WO00/09885
PCT Pub. Date: Feb. 24, 2000

(30) Foreign Application Priority Data

Aug. 13, 1998 (DK) .......................... 1998 01031
Aug. 13, 1998 (DK) .......................... 1998 01030
Apr. 14, 1999 (DK) .......................... 1999 00493

(51) Int. Cl.[7] ............................................. F03D 7/02
(52) U.S. Cl. .................. 416/1; 416/155; 415/4.3; 415/908
(58) Field of Search ...................... 416/1, 155, 157 R, 416/153, 169 R; 415/4.3, 4.5, 908

(56) References Cited

U.S. PATENT DOCUMENTS

| 2,487,836 | A | | 11/1949 | Turnbull | |
|---|---|---|---|---|---|
| 4,527,072 | A | * | 7/1985 | van Degeer | ............ 290/55 |
| 4,653,982 | A | * | 3/1987 | Kojima et al. | ............ 416/3 |
| 4,772,182 | A | * | 9/1988 | Witte | ............ 416/152 |

FOREIGN PATENT DOCUMENTS

| DE | 4221783 | 1/1994 |
|---|---|---|
| EP | 0094106 | 11/1983 |
| WO | WO8300195 | 1/1983 |

* cited by examiner

Primary Examiner—Edward K. Look
Assistant Examiner—Richard A. Edgar
(74) Attorney, Agent, or Firm—Birch, Stewart, Kolasch & Birch, LLP (57) ABSTRACT

A method and mechanism for adjusting/controlling the pitch of at least one blade of a wind turbine relative to a wind direction parallel to a longitudinal main shaft of the wind turbine use a mechanism with a motor for rotating drive wheels in the angle gear around a longitudinal blade shaft via drive wheels of an angle gear. The method and mechanism can stop the complete turning of a main shaft of a wind turbine having a motor to rotate a drive pinion in an angle gear via a drive wheel, the angle gear being meant to pitch at least one blade around a longitudinal axis.

28 Claims, 5 Drawing Sheets

METHOD AND A DEVICE FOR ADJUSTING THE PITCH AND STOPPING THE ROTATION OF THE BLADES OF A WIND TURBINE

This application is the national phase under 35 U.S.C. §371 of PCT International Application No. PCT/DK99/00433 which has an international filing date of Aug. 13, 1999, which designated the United States of America.

The present invention relates in a broad aspect to a device and a method for adjusting the pitch of a wind turbine and for stopping the rotation of the blades of a wind turbine.

BACKGROUND OF THE INVENTION AND INTRODUCTION TO THE INVENTION

In one aspect, the present invention relates to a method of adjusting the angular position of at least one blade of a wind turbine, the said wind turbine comprising a bevel gear and a motor for the rotation of a drive wheel of the bevel gear and drive pinions of the bevel gear for turning at least one blade at an angle, this at least one blade being turned at an angle by the drive pinions, the said drive pinions being rotated by the drive wheel, and the drive wheel being rotated by the motor relative to the main shaft. The invention also relates to a mechanism for controlling the pitch of at least one blade of a wind turbine relative to a wind direction parallel to a longitudinal main shaft of the wind turbine, the said mechanism comprising a motor for rotating drive wheels in the bevel gear around a longitudinal blade shaft via drive wheels of a bevel gear. Furthermore the invention relates to a wind turbine having such a mechanism.

In another aspect, the present invention relates to a method of stopping the complete rotation of the main shaft of a wind turbine comprising a motor to rotate a drive pinion of a bevel gear via a drive wheel of the said bevel gear, the said drive pinion being meant to turn at least one blade of the wind turbine around its longitudinal axis. The invention also relates to a mechanism for stopping the complete turning of a main shaft of a wind turbine comprising a motor to rotate a drive pinion in a bevel gear via a drive wheel, the said bevel gear being meant to pitch at least one blade around a longitudinal axis. Furthermore the invention relates to a wind turbine provided with such a mechanism.

DE 42 21 783 describes a device for setting the pitch angle of wind turbine blades. The device comprises an electrical motor mounted inside a fixed bearing. Surrounding the fixed bearing a longitudinal axis of rotation has been installed. On the rotational shaft blades have been installed which can be set at an angle relative to the main shaft and relative to a wind direction parallel to the longitudinal main shaft. The motor adjusts the pitch of the blades through a bevel gear. The longitudinal main shaft rotating and the pitch of the blades being correct, the motor must rotate at the same speed of rotation as the main shaft to maintain the correct pitch of the blades.

This is a major disadvantage. First, it requires very accurate control of the dynamic relations between motor and main shaft, i.e. the rotational speed of the motor in relation to the rotational speed of the main shaft. Second, the motor has to operate continuously to maintain the correct blade pitch. This results in extensive wear of the motor and entails large energy consumption for operating the motor. Furthermore it is necessary to control the speed of rotation variably and continuously relative to the variations in the speed of rotation of the main shaft, and the motor control risks being constantly somewhat behind compared with the main shaft, and consequently an optimal pitch angle of the blades cannot always be obtained.

Furthermore, the device is not capable of stopping or limiting the rotation of the main shaft in a controlled manner in case the motor cannot rotate because of e.g. current failure of the motor shaft rotation. The main shaft will, however, stop rotating after a while, since the blades once the motor no longer rotates synchroneously with the main shaft will soon be pitched at angular positions which are not optimal for the main shaft rotation. The blades will then reach a stable pitch characterized by the main shaft not rotating at the said pitch.

EP 0.094.106 describes a pitch controlling device according to the above. Thus, the device has a pitch motor for controlling the pitch of the blades in an operational situation of the wind turbine. A synchronizing shaft is connected to the blades through a bevel gear and the synchronizing shaft may be rotated by the pitch motor. In order for the pitch motor to rotate the synchronizing shaft, an electromagnetic clutch must be activated because the synchronizing shaft is journalled by means of bearings in the rotatable main shaft of the blades and the pitch motor is fastened to a stationary part of the wind turbine in relation to the main shaft.

However, the need for a clutch or other means of coupling the pitch motor and the synchronizing shaft by means of a disengagable coupling means is a disadvantage. The clutch may be worn or may even failure, which makes it impossible to control the pitch of the blades. If the pitch of the blades cannot be controlled then the wind turbine is not able to produce the maximum amount of effect or may even not be able to produce effect at all. If the clutch is worn or has a failure, then it is furthermore necessary to stop the wind turbine and to repair the clutch or exchange the clutch with a new one. This is time consuming which decreases the overall efficiency of the wind turbine. Furthermore it involves costs of a technician and the costs of spare parts. Lastly using a clutch or other disengagable coupling means may delay controlling of the pitch of the blades when as example a clutch has to be activated before controlling of the pitch of the blades can take place. Accordingly, the use of a clutch involves many disadvantages.

DE 196 34 059 and other prior art wind turbines achieve stopping the rotation of the main shaft by pitching the blades by means of individual motors at each blade. Pitching the blades in this way may have the same technical effect as the above-mentioned procedure and the main shaft stops so that the main shaft either effects no rotation at all or only rotates very slowly in its positive direction of rotation. However, this prior art necessitates the use of a pitch motor for each of the blades. Furthermore, an individual control of the pitch motors as well as a mutual control of the pitch motors will be necessary in order to assure that each blade of the wind turbine is having the same pitch as the other blades.

The object of the present invention is to provide a mechanism which does not suffer from the above mentioned disadvantages, and which will thus to a larger extent be able to establish and maintain the correct pitch of the blades, whether the control is sufficiently precise or not, and without major wear to the gear motor and the pitch motor, or high energy consumption for operating the pitch motor and without the risk of being the method and the mechanism being delimited in the controlling of the pitch because of sudden failure or ordinary wear of coupling means between the pitch altering means and the pitch motor.

The present object is in one embodiment of the invention achieved by a method characterised by the rotation of a drive wheel relative to the main shaft being brought to a standstill once the blades have reached the correct pitch, said drive wheel establishing a permanent coupling between the pitch motor and the synchronizing shaft.

Bringing the rotation of the pitch motor to a standstill relative to the main shaft while the said main shaft is rotating under normal operational conditions provides several advantages. Firstly, the wear of the pitch motor will be substantially reduced compared with a method continuing the rotation of the pitch motor rotation shaft also under normal operational conditions when correct pitch of the blades has been established.

Furthermore, continuously monitoring the speed of rotation of the pitch motor relative to the speed of rotation of the main shaft is no longer necessary. Finally, the pitch motor is used exclusively for controlling the pitch of the blades and is not used simultaneously for maintaining a speed of rotation of the drive wheel relative to the speed of rotation of the main shaft, a function which entails further technical control difficulties.

A mechanism for use in the method is characterised in that the motor is mounted on the longitudinal main shaft.

Mounting the motor on the main shaft provides the possibility of no longer having to exert control over the relative speed of rotation of the motor and the rotational shaft. The motor does not rotate if the correct pitch of the blades has been established. Any less exact tolerances and any wear to the mechanical parts will have no essential influence on maintaining the correct pitch of the blades, the motor controlling the pitch respective to given values such as the speed of rotation of the main shaft, the wind speed, etc, and the load on the mechanical parts will be purely static once the correct pitch has been established, since there are no dynamic relations between the motor, the main shaft and the bevel gear once the correct pitch of the blades has been established. Furthermore, there is no need for any disengagable coupling between the drive axle of the pitch motor and the synchronizing shaft. This also ensures that no mechanical wear or even mechanical failure occurs which may impede the controlling of the pitch of the blades and reduce the overall efficiency of the wind turbine.

In a preferred embodiment the mechanism is characterised by the synchronizing shaft being provided with a rotating portion of a brake, a fixed portion of the brake being mounted on the main shaft, and the brake being directed to maintain the synchronizing shaft relative to the main shaft in a situation when it is desirable that the pitch of the blades is maintained in a normal operational position.

Mounting a brake further provides the advantage that static relations between motor, main shaft, bevel gear and blades are not to be maintained by the motor operating as a brake to maintain static relations, these relations between main shaft, bevel gear and blades being instead maintained by a brake to relieve the motor when the correct pitch of the blades has been established and the motor therefore is not operating.

In a further aspect of the present invention, the purpose of the present invention is to bring the main shaft to a standstill in connection with a novel mechanism for regulating the pitch of the blades in normal operation.

This purpose is achieved by a method characterised by a synchronizing shaft for the drive wheel being slowed down synchronously with the rotation of the main shaft, and by the continued rotation of the main shaft turning the at least one blade of the main shaft at a pitch corresponding to a so-called pitch angle differing from an operationally optional pitch angle.

A preferred embodiment of the invention is characterised by the blades being permitted to turn in a positive and negative direction when the drive wheel synchronizing shaft is stopped, allowing the main shaft to rotate alternately in a forward and a reverse direction of rotation.

Bringing the rotation of the main shaft to a standstill is a novel feature, partly by the mechanism controlling the pitch of the blades being new, and partly by the main shaft coming automatically to a standstill in case of current failure of the motor controlling the blade pitch, the so-called pitch motor. Stopping takes place in such a way that the main shaft is not brought to a complete halt, but allowed to rotate around a point of equilibrium. This method of the invention allows the main shaft to rotate alternately and partly in a forward and partly in a reverse direction of rotation. This means that the main shaft bearings and the rotation collar bearings are in motion and therefore will not fail because of any unilateral static load nor because of any dynamic spot load when the main shaft and the rotation collars are completely stopped, nor will they be insufficiently greased by the slow turning of the main shaft in a positive direction of rotation only.

A mechanism to be employed by the method is characterised by a synchronizing shaft for the drive wheel being provided with a movable portion of a brake, a fixed portion of a brake being mounted a fixed frame relative to the main shaft, and by the brake being meant to secure the drive wheel synchronizing shaft relative to the fixed frame in case it is desirable that the pitch of the blades should be placed in a position for stopping the complete rotations of the main shaft.

By mounting a brake as defined the rotation of the main shaft can be slowed down in any case of pitch motor failure resulting from a current failure putting the pitch motor out of use. The negative brake will mainly be activated mechanically so that its function is independent of current.

BRIEF DESCRIPTION OF THE INVENTION

The problems discussed above has been solved by means of the present invention which provides a device for controlling the pitch angle of a wind turbine blade of a wind turbine having a main shaft rotatably connected to a base part of the wind turbine, and at least one blade connected to the main shaft, the connection enables rotation of the blade about a longitudinal axis of the blade, pitch angle altering means connected to the at least one blade for altering the pitch angle of said blade, and said the pitch altering means comprising a bevel gear with a drive wheel being rotated by the synchronizing shaft and drive pinions for turning the at least one blade at an angle a synchronizing shaft connecting the driving means with the pitch angle altering means, at least a part of the synchronizing shaft being aligned with and extends along or parallel with a central axis of the rotatably connected main shaft, so that upon activation of the driving means a difference in angular rotation between the synchronizing shaft and the rotatably connected main shaft is introduced, as the pitch angle altering means is/are adapted to convert the angular rotation difference into a rotation of the at least one blade along its longitudinal axis, whereby the pitch angle of the at least one blade is/are altered by activating the driving means, said pitch controlling device furthermore comprising—an activatable driving means retained to the rotatably connected main shaft.

The activatable driving means is the part of the device according to the invention being activated when the pitch of the wind turbine is to be altered. As indicated, the activatable driving means is only to be activated when the pitch is to be altered, due to the fact, as will become clear from the description below and the accompanying examples of embodiments of the invention, that when the driving means is retained in a motion following the motion of the main shaft, no activation is needed in order to keep the pitch of the blades.

In fact, the synchronizing shaft rotates along with the main shaft as long a the pitch angle is not to be altered and therefore if a reference is chosen being the system rotating with the same angular rotation as the main shaft the observer following this reference system will observe the synchronizing shaft standing still. The difference in angular rotation should therefor in this connection be seen from point of reference fixed to the ground or the base of the wind turbine which is equivalent with the fact that an observer observing the motion of the synchronizing shaft will observe the synchronizing shaft rotating when the stated difference in angular rotation is present.

In preferred embodiment of the present invention the pitch controlling device may further comprise preventing means for preventing the pitch altering means from converting the angular rotation difference into a rotation of one or more of the at least one blade when the torque needed to rotate the one or more blade(s) along its longitudinal axis exceed a predetermined torque. This—or these—preventing means is typically applied in order to assure that once a pitch setting of the blades has been provided then for instance the aerodynamic forces acting on the blades will not be able to alter the pitch. The preventing means may be applied by for instance disk brakes, pneumatic means or the like influencing directly or indirectly on the blades possible of being able to rotate along an axis extending substantially in the direction of the blades.

Furthermore, these preventing means may also serve a safety purpose. In this case the preventing means may prevent the blades from being turned when a difference in rotation is introduced between the main shaft and the synchronizing shaft, and a preventing means may be applied to each blade. Such a utility may be very important for instance when risk of blocking the turning of the blades for instance by ice or other deposits is present. In a preferred embodiment of the invention the present invention when serving a safety purpose, the preventing means is constituted by a friction clutch.

The activatable driving means may preferably be a motor, such as an electrical motor, a hydraulic driven motor or a pneumatic driven motor and the pitch altering means is preferably comprised of an bevel gear with a drive wheel being rotated by the synchronizing shaft and drive pinions for turning the at least one blade at an angle.

In a preferred embodiment of the pitch controlling device according to the present invention, the activatable driving means is/are located at a rear part of the main shaft and the pitch altering means is being located at a front end of the main shaft of the wind turbine. In order to connect these to part (means) the synchronizing shaft of which there may be more than one extends from the rear to the front end of the main shaft and even though it may be advantageous to let the synchronizing shaft(s) extend at the exterior of the wind turbines main shaft it is presently preferred that the synchronizing shaft(s) extends through the interior of the main shaft so that the two shafts in question is concentric.

In an embodiment where more than one synchronizing shaft is utilised each of these shafts may be connected to a blade so that each blade is pitched by one shaft. Also in this embodiment the shafts may advantageously extend through the interior of the wind turbines main shaft.

In another and presently most preferred embodiment of the present invention both the activatable driving means and the pitch altering means are located at a front part of the main shaft. Also in this embodiment the synchronizing shaft(s) may extend from the rear to the front end of the main shaft and the synchronizing shaft(s) extends through the interior of the main shaft.

To provide the pitch controlling device according to the present invention being able to lock the rotation of the synchronizing shaft to the rotation of the main shaft the synchronizing shaft(s) is/are provided with a part of a brake being able to rotate and a part of the brake being unable to rotate is mounted on the main shaft. This brake is preferably a positive brake—i.e. a brake providing a braking force only when activated—whereby the pitch of the blades may be locked only intentionally in the sense that the brake in normal operation needs to be activated in order to lock the rotation of the synchronizing shaft to the main shaft.

A preferred brake applied in the above mentioned embodiment of the present invention is a brake wherein the part being able to rotate is a brake disc and the part of the brake being unable to rotate is a brake calliper having a brake shoe or alternatively wherein the part of the brake being able to rotate is a brake calliper having a brake shoe mounted on the synchronizing shaft and the part of the brake being unable to rotate is a brake ring mounted on the main shaft.

In another aspect it is desirable to be able to fix—or limit—the rotation of the main shaft when the wind turbine has been stopped. This is achieved as the synchronizing shaft(s) may be provided with a part of a brake being able to rotate and a part of the brake being unable to rotate is mounted on a stationary part of the wind turbine such as on the chassis.

Preferably different types of brakes are used in the embodiments of the present invention and in general when a fail safe brake is to be applied braking force is released by means of electric, hydraulic, mechanic or any other kind of applied dynamic force and when a controlling brake is to be applied braking force is applied by means of springs, hydraulic oil pressure or similar mechanically applied static force.

Power has to be supplied to the activatable driving means and in case this means is an electrical motor, electrical current to the electrical motor is preferably supplied by at least one slipring mounted concentrically with the main shaft and connected to a power supply. The same methodology may also be applied in case a pneumatic driven motor constitutes the activatable driving means and in this case the slipring will be designed to transfer fluids instead of electrical current.

In another preferred embodiment of the pitch controlling device according to the present invention the electrical current to the activatable driving means is preferably supplied by a power source contained in the main shaft or the main shaft being a part of the a power source. This power source may be a battery being charged for instance by induction. The use of a battery is especially useful when only few—and perhaps small—variations of the blades pitch is introduced since the activatable driving means only consumes power when activated and then there is time available for recharging the battery.

In still a preferred embodiment of pitch controlling device according to the present invention the wind turbine comprises a multi-pole generator having a rotor constituting the main shaft of the wind turbine.

In an embodiment of the invention where the wind turbine is being equipped with a multipole the generator is preferably being connected aligned with at the rear end of the wind turbine.

In another aspect the present invention relates to a method for controlling the pitch angle of a wind turbine using the pitch controlling device according to present invention where the synchronizing shaft and the activatable driving means are permanently connected. In the method aspect the pitch angle is controlled by:

activating the driving means and thereby instantly rotating the synchronizing shaft when activating the driving means introducing a difference in angular rotation between the synchronizing shaft(s) and the main shaft, transferring the difference in angular rotation between the synchronizing shaft and the main shaft to the pitch angle altering means, de-activating the driving means and thereby instantly stopping the rotation of the synchronizing shaft Even though the step as described above may be viewed upon as succeeding steps this is normally not the case as these steps are executed in a mechanical device wherein no or at least very little delay is aimed at. The sequence of steps rather expressed the way the altering of the pitch is initiated and the way the "information" is passed on to the blades. Also, "transferring" may be viewed upon as the action of the bevel gear, for instance, when being active i.e. the teeth of the gear move relative to each other on the effect of the difference in rotation between the synchronizing shaft and the main shaft.

Actually, the alteration of the pitch angle is determined by the operation of the activatable driving means as this means is the one effecting the difference in rotation between the synchronizing shaft and the main shaft. The "predetermined amount" may suitable be expressed in terms of radians and the like and as the gearing for instance in the gear transferring is known—if such a gear is used as pitch altering means—the difference in rotation and rotation of the blades also is known which may be expressed as a transferring function giving a functional relationship between for instance the turning of the blade per revolution of the driving means (in case a motor is used), whereby it is an easy task to determine the number of revolutions the driving means has to perform in order to turn the blade a predetermined amount.

After the pitch angle of the blades has been set the method according to the present invention may further comprise the step of retaining the angular position of the synchronizing shaft relative to the angular position of the main shaft, in order to assure that no further turning of the blade will accomplished. If this step is included in the method, the pitch altering process must be initiated by releasing the synchronizing shaft relative to the main shaft otherwise a difference in angular rotation between the two shafts may not be accomplished.

During normal operation of the wind turbine, i.e. when the turbine is being operated in production mode, and in particular the during normal application of the method for controlling the pitch angle, the pitch angle is controlled so that the pitching of the blades is between +2° to −10°, primarily between +1° to −5°.

In yet another aspect the present invention relates to a method for stopping the rotation of the blades of a wind turbine. The method applies the method of controlling the pitch angle of wind turbine blade according to the present invention and the stopping is provided by retaining the synchronizing shaft to a stationary part of the wind turbine.

In order to for instance motioning the bearing in which the main shaft is sitting the main shaft is allowed to turn in either positive or negative direction when the synchronizing shaft is being retained to a stationary part of the wind turbine.

Typical and preferred values of the angle which the main shaft is allowed to turn in either positive or negative direction when the synchronizing shaft is being retained to a stationary part of the wind turbine is given by pitching the blades between 0° to −20° primarily −10° to −15°, when the wind turbine is operating in a so-called negative stall mode.

When the wind turbine is operating in a so-called positive pitch mode the angle the main shaft is allowed to turn in either positive or negative direction when the synchronizing shaft is being stopped is given by pitching the blades around −1° to +90°, such as between 0° to 65° primarily 0° to 40°.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in greater detail in the following by reference to the enclosed drawings, which are given by way of illustration only, and thus are not limitative of the present invention, and in which.

DETAILED DESCRIPTION OF PREFERRED EMBODIMENTS OF THE INVENTION

Figure 1:
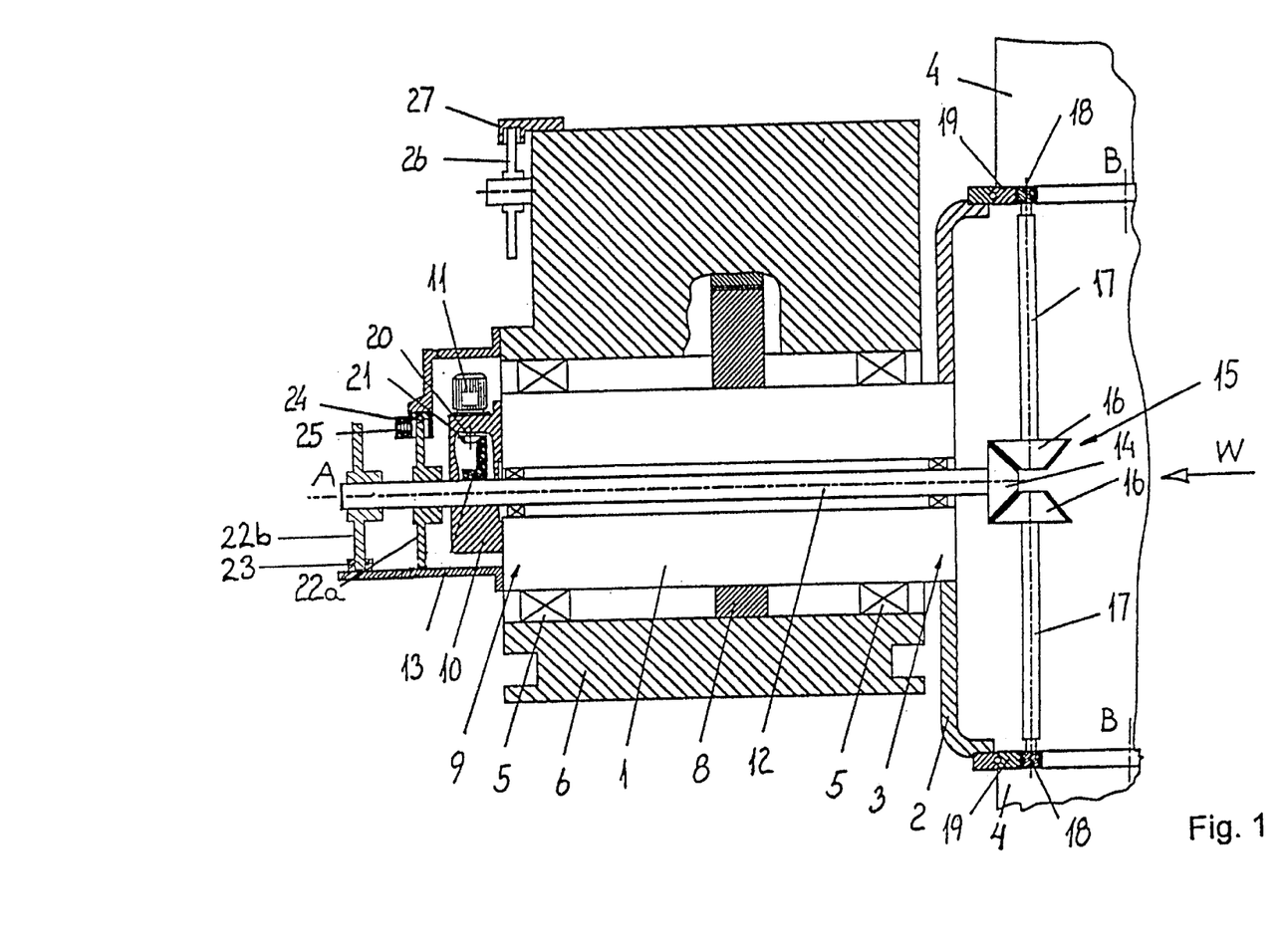
FIG. 1 shows a preferred embodiment of a fail-safe brake for stopping the rotor of a wind turbine and a drawing in principle of an embodiment of a mechanism of the invention.
Figure 2:
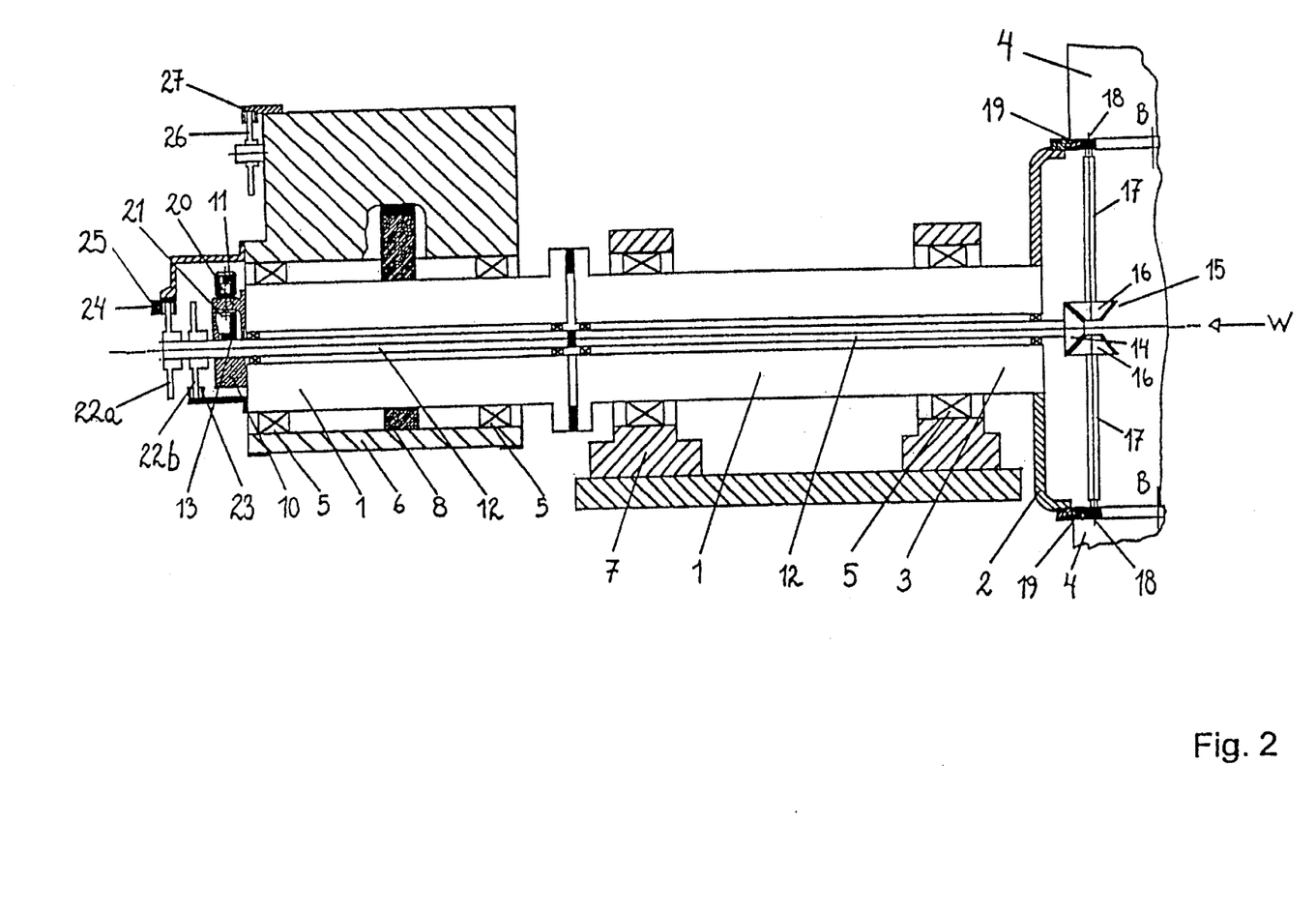
FIG. 2 shows an alternative embodiment of a fail-safe brake for stopping the rotor of a wind turbine and a drawing in principle of an embodiment of a mechanism of the invention.

FIG. 1 and FIG. 2 illustrate a part of a drive mechanism of a wind turbine, FIG. 1 showing a first preferred embodiment where the main shaft of the blades is integrated in the main shaft of transmission, and FIG. 2 showing a second preferred embodiment where the main shaft of the blades is separate relative to the main shaft of transmission. Each of the two embodiments technically operates in the same way in relation to the invention.

In an alternative embodiment of the present invention (not shown) the generator is a multipole generator and the blades 4 are connected to the rotor of that generator. Thereby the main shaft 1 is either not present or is constituted by the shaft of the generator. In both cases the transmission connecting the generator to the mains shaft is not present.

The drive mechanism comprises a longitudinal main shaft 1 of a rotor. The rotor has a hub which is secured to the front end 3 of the main shaft and which faces a wind direction W. On the hub blades 4 are mounted which in the embodiment of the drive mechanism shown extend perpendicularly to an axis of rotation A of the longitudinal main shaft 1. The blades 4 are mounted rotatably on the hub so as to be able to rotate around an axis B perpendicular on the longitudinal main shaft 1. In alternative embodiments the blades 4 and the axis B may extend at an angle differing from a right angle relative to the axis of rotation A, e.g. in turbines where the blades have been submitted to socalled "coning" relative to the main shaft to create a greater distance between the blades and the turbine tower, and where the blades form an obtuse angle with the axis of rotation A.

The main shaft 1 is supported by bearings 5 which in FIG. 1 are shown mounted in a gearbox 6 and in FIG. 2 mounted in a chassis 7. A gearwheel 8 is shown, and the gearbox 6 is mounted rotatably relative to a turbine tower (not shown) around a vertical axis. By means of a flange 10 on the rear end 9 of the main shaft 1 a motor 11 has been mounted, this being an electrical motor in the embodiment shown. The motor is a pitch motor for controlling a socalled pitch angle of the blades 4 relative to the wind direction W.

A synchronizing shaft 12 having a gear wheel 13 extends through the interior of the main shaft 1 from the rear end 9 of the main shaft 1 to the front end 3 of the main shaft 1. The synchronizing shaft 12 is provided at the front with a conical gear wheel 14 forming a drive wheel in a bevel gear 15. Other conical gear wheels 16 forming drive pinions of the bevel gear engage with the drive wheel 14. The drive pinions 16 of the embodiment of the hub as shown connected through shafts 17 to cylindrical gear wheel 18 forming a drive wheel and engaging with a pivot joint 19 forming part of the blades 4. Via the gear wheel 13, the drive wheel 14, the drive pinions 16, the drive wheels 18 and the pivot joint 19 the synchronizing shaft 12 can rotate the blades 4 around the axis B. The motor may alternatively be mounted on the front end 3 of the main shaft 1, and the synchronizing shaft 12 may extend from the front end 3 to the rear end 9.

The shafts 17 are according to the preferred embodiment shown in FIG. 1 indicated as being rigid parts. In order for these shafts 17 to be able to adapt to for instance inaccuracies provided during manufacturing, environmentally governed changes of the geometry of the shafts 17 and/or the changes in geometry of other parts of the wind turbine, the shafts 17 are preferably provided means for adapting to such changes. Examples of such means could be to design the shafts as splines (a shaft being comprises of two parts longitudinal slideable engaged with each other) provide the shafts 17 with cardan joint or combinations thereof.

In the embodiment shown a single common pitch motor 11 is provided which via a common synchronization shaft 12 and the bevel gear 15 controls the pitch angle of all blades 4 simultaneously. Alternatively it is possible to provide each blade 4 with its own drive shaft instead of a common synchronizing shaft 12, its own drive wheel 14 and its own pitch motor 11. It is also possible to submit only a few of the blades 4 to a pitch control by a common pitch motor 11, common synchronization shaft 12 and bevel gear 15, and to have the other blades 4 be controlled individually. The individual pitch motors may either be placed according to prior art in the hub 2 or may be placed at the rear end 9 of the main shaft 1 having drive shafts extending through the interior of the main shaft 1.

The rear part 9 of the main shaft 1 is provided, as described above, with a pitch motor 11. A drive shaft 20 of the pitch motor 11 is via a gear motor comprising in the embodiment shown a drive wheel 21 and the gear wheel 13, connected to the synchronizing shaft 12 in such a way that the pitch motor 1 can drive the synchronizing shaft 12. Alternatively to the gear motor the drive shaft 20 of the pitch motor 11 may be connected direct to the synchronizing shaft 12. The entire pitch motor 11, the gear motor and the flange 10 will by rotation of the main shaft 1 rotate with the main shaft 1. The pitch motor 11 of the embodiment shown is an electrical motor, but alternatively it may be a hydraulic motor or a pneumatic motor. Current for the pitch motor may be supplied via a number of sliprings (not shown) so as to provide electrical energy to the pitch motor 11 indirectly from an external source of electrical energy through the slip rings.

The pitch motor may also be powered by a battery (not shown) incorporated in the main shaft so as to supply electrical energy from the generator or the battery directly to the pitch motor. The battery may then indirectly be charged by an external source of energy. Alternatively a generator may be incorporated as a part of the main shaft in such a way that the generator by rotation of the main shaft can supply electrical energy directly for charging the battery. Furthermore, the motor and/or the battery may be powered by induction.

Even though it is possible to keep track of the present pitch setting of the blades through recording all changes made to the pitch angle, it may be advantageous to be able to detect the actual pitch setting. This detection of the pitch setting is suitable performed by a detecting means positioned at the hub providing a signal corresponding to the pitch of the blades. The pitch may be detected for one blade thereby representing the pitch setting of all the blades of the wind turbine or the pitch may be detected for each individual blade whereby it will be possible to detect if one or more blade is not synchronised with the remaining blades. In both case signals originating from the (these) detecting means have to be transferred to a controlling mean being typically a computer controlling the overall performance of the wind turbine. This computer is usually situated retained to the stationary part of the wind turbine, if the computer is not situated far away from the wind turbine in a controlling centre controlling more than one wind turbine, and therefor the signals are transferred from the rotating parts to the stationary parts via telemetry, via slip rings or the like.

A movable section of a brake mechanism in the form of a brake disks 22*a* and 22*b* is mounted on the synchronizing shaft 12. Around the brake disks 22*a* and 22*b* fixed sections of brake mechanisms are mounted in the form of a number of brake shoes 23, 24. A first brake shoe 23 is fixed relative to the main shaft 1 and will thus rotate simultaneously with the rotation of the main shaft 1. A second brake shoe 24 is fixed relative to the gearbox 6 and will therefore not rotate with the main shaft 1, the main shaft 1 being rotatably seated relative to the gearbox 6. The first brake shoe 23 provides one section of a first brake mechanism termed the positive brake. The second brake shoe 24 provides one section of a second brake mechanism termed the negative brake.

Alternatively to mounting the brake disks 22*a* and 22*b* on the synchronizing shaft 12 and the brake shoes 23,24 on the main shaft 1 respectively the gearbox 6, it will be possible to mount one or both brake shoes 23, 24 on the synchronizing axle 12 and to mount brake rings (not shown) corresponding to the brake disks 22*a* and 22*b* on the main shaft 1 respectively the gearbox 6. In this way the brake shoes 23, 24 will provide the movable part of the brake and the brake rings will provide the fixed part of the brake.

The positive brake 22b, 23 is meant to maintain the synchronizing shaft 12 relative to the main shaft 1 so as to prevent the blades from pitching around the axis B. The positive brake 22b, 23 will be activated by hydraulic, electric or pneumatic means once the pitch motor 11 has rotated the synchronizing shaft 12 and thereby through the bevel gear 15 tilted the blades 4 to a desired pitch of the blades 4. To avoid unnecessary load on the pitch motor 11 the pitch motor will not be used to maintain a desired blade pitch, but the positive brake 22b, 23 will be activated to maintain the established pitch of the blades 4.

The negative brake 22a, 24 is meant to maintain the synchronizing shaft 12 relative to the gearbox 6 so that the blades 4 will automatically tilt relative to the hub 2 when the main shaft 1 rotates relative to the gearbox 6, as the synchronizing shaft 12 is secured relative to the gearbox 6. This will be the case if on account of an operational breakdown such as an interruption of the control current to pitch motor 11 and control current to positive brake 22b, 23 it becomes desirable to stop the rotation of the main shaft 1 to avoid that the operation of the wind turbine falls below the optimal level.

In other cases of failure it may be desirable to stop the rotation of the main shaft to avoid an overload on the mechanical parts such as the main shaft 1, the bevel gear 15 or the gear motor. However, generally in the case described it will be desirable to stop the rotation of the main shaft to prevent the speed of rotation rising above a predetermined level. The negative brake 22a, 24 in this case provides a so-called fail-safe brake by the blades 4 being tilted around the longitudinal axis B of the blades 4 when the main shaft 1 is rotating. The effect of the negative brake 22a, 24 is provided by springs 25 or other means not requiring any external electric or hydraulic energy for exerting a force. When the negative brake 22a, 24 is not in operation as a fail-safe brake the springs 25 are secured in a prestressed state by means of a hydraulic or electric power source (not shown) requiring control current to operate. As soon as the control current drops, the hydraulic or electric power source stops operating, the load on the springs 25 stops, and the spring force is triggered, having the effect of slowing down the synchronizing shaft 12 by means of the negative brake 22a, 24.

If the blades 4 rotate relative to the hub 2, they will at some point in time be placed in an angular position that entails that the wind W will no longer be able to drive the blades 4 sufficiently to move the main shaft 1. The main shaft 1 will then stop its rotation. Prior to that time the blades 4 will generally have rotated so much relative to the hub 2 that the blades are placed in an angular position which will make the main shaft 1 rotate in reverse direction of rotation. Before the main shaft 1 stops its rotation, the main shaft will therefore have rotated partly around an equilibrium alternately in a forward direction and a reverse direction of rotation. When the main shaft 1 has found its position of equilibrium the main shaft 1 may then be brought to a complete standstill by means of a transmission brake 26, 27 which in this case acts as a parking brake for the main shaft 1. The transmission brake 26, 27 is normally a disk brake secured to a shaft in the gearbox 6 and having a brake shoe 27 which is secured to the gearbox 6, thus slowing down the main shaft 1 relative to the gearbox 6.

In certain cases it may be advantageous to let the main shaft 1 continue its partial rotation alternately in forward and reverse directions of rotation since the bearings 5 will be kept in motion when the wind turbine has been slowed down by a fail-safe brake, i.e. stopped at an operational breakdown as a result of a failure of control current to the pitch motor 11. In that case the blades 4 will be pitched at a different pitch angle than the optimal pitch angle until there is no more rotational energy in the forward direction of rotation to rotate the main shaft 1. The extent of the different pitch angle at which there is no more rotational energy depends on the actual design of the blades 4 and on the actual mounting of the blades 4 on the hub 2. In the following concrete values for pitch angles will be stated in different operational cases, but the method and the mechanism of the invention can be used to control the rotation and slowing down of the main shaft both in turbines using positive pitch control and in turbines using negative pitch control. By positive pitch control is meant control by turning the leading edge of the blade against the wind and by negative pitch control is meant control by turning the trailing edge of the blade against the wind.

For a given configuration of the blades 4 and for a given mounting of the blades on the hub 2 the second pitch angle may be e.g. between −5° and −25°. Should the blades 4 start a reverse rotation, the blades 4 will find a different pitch angle until there is no more rotational energy in the reverse direction of rotation to rotate the main shaft 1. The blades 4 will find a pitch angle of equilibrium which is different from the optimal pitch angle, depending on the actual configuration of the blades 4 and the actual mounting of the blades 4 on the hub 2, e.g. a pitch angle of −5° to −25°, where the main shaft 1 will rotate partly and alternately in a forward direction and a reverse direction of rotation at a very low speed of rotation. In that case the main shaft will not be slowed down by the transmission brake 26, 27.

When the main shaft 1 has been brought to a standstill and in the case mentioned above when the main shaft is then slowed down by the transmission brake 26, 27, the blades 4 will be pitch controlled to a given pitch angle depending on the actual design of the blades 4 and on the actual mounting of the blades 4 on the hub 2, in order to reduce the axial load on the hub 2, the main shaft 1 and the bearings 5. For a given design of the blades 4 and a given mounting of the blades 4 on the hub 2 the pitch angle may be e.g. −100°. When the pitch motor 11 once the main shaft 1 has been slowed down by the transmission brake 26, 27 has pitch controlled the blades to e.g. −100°, the positive brake 22b, 23 will be used to maintain the angular pitch of the blades. For the sake of security an end stop may be provided at abt. −120°.

In normal operation the blades 4 will be pitch controlled so as to achieve maximum production of electric energy. To prevent the blades 4 from being erroneously pitch controlled in the positive direction, the blades 4 of may be provided with an end stop in the positive direction at a pitch angle of e.g. +2°, but the extent of the pitch angle depends on the actual design of the blades 4 and on the actual mounting of the blades 4 on the hub 2.

By normal slowing down in connection with other failures than control current failure the blades 4 will be pitch controlled by the pitch motor at an angular position which depends on the actual design of the blades 4 and on the actual mounting of the blades 4 on the hub 2. For a given design of the blades 4 and a given mounting of the blades 4 on the hub 2, the pitch angle may be −10°. Then the negative brake 22a, 24 will automatically slow down the synchronizing shaft 12 so that the main shaft 1 finds its equilibrium where the rotation of the main shaft 1 ceases. The main shaft 1 may then rotate partially and alternately in a forward or a reverse direction of rotation at reduced speed of rotation. The negative brake 22a, 23 in this case does not act as a real fail-safe brake, but as a parking brake for the synchronizing shaft 12, but the main shaft 1 will, as mentioned, be able to rotate alternately in a forward direction and a reverse direction of rotation. Alternatively the transmission brake 26, 27 can be used to slow down the main shaft 1 simultaneously with the synchronizing shaft 12 being slowed down by the negative brake 22a, 24 or by the positive brake 22b, 23.

By normal slowing down in connection with high wind speeds the blades 4 will be pitch controlled by the pitch motor 11 to a natural socalled parking position of the blades of e.g. −15°, but depending on the actual design of the blades 4 and on the actual mounting of the blades 4 on the hub 2, a trailing edge (not shown) of the blades 4 being turned against the wind (active stall), and the rotation of the main shaft 1 stopping very rapidly. Then the transmission brake 26, 27 will slow down the main shaft 1 and the blades 4 will be pitch controlled at a forced socalled feathering position of the blades of e.g. −90° to reduce the axial loads on the hub 2, the main shaft 1, and the bearings 5. When the angular position of e.g. −90° has been established, the negative brake 22a, 24 will slow down the synchronizing shaft 12 to maintain the pitch angle of −90°.

The negative brake 22a, 24 is preferably maintained in an activated state by mechanical means 25 such as coil springs or dish springs, the negative brake 22a, 24 having to operate without the use of hydraulic, electric or pneumatic energy if the fail-safe brake action is to be established as a result of control current failure to the wind turbine. The negative brake 22a, 24 thus provide, as mentioned, a socalled fail-safe brake. The negative brake may be maintained in a non-activated state by hydraulic, electric or pneumatic means.

The stopping (or slowing down) of the main shaft 1 was described above with respect to negative pitch control but as mentioned earlier the method may just as well be used when the turbine is working in a positive pitch control mode. In general the method as described above basically the same in case the turbine is working in a positive pitch control mode and therefore the description of the negative pitch control mode is also applicable in the positive pitch control mode now considering the pitching of the blades 4 to proceed in the opposite direction.

In this case the blades 4 will find a pitch angle of equilibrium which is different from the optimal pitch angle, depending on the actual configuration of the blades 4 and the actual mounting of the blades 4 on the hub 2, e.g. a pitch angle of −1° to +90°, where the main shaft 1 will rotate partly and alternatively in a forward direction and reverse direction at a very slow speed of rotation. In that case the main shaft 1 will not be slowed down by the transmission brake 26, 27.

The blades 4 of the wind turbine have typically cross sections made up by airfoil profiles being asymmetrically so as to design the turbine to produce as much effect as possible with lowest possible loss. The alternatively rotation of the main shaft 1 occurring in general may be replaced by a more steady state in which the blades 4 stays in a substantial fixed position relative to the wind turbine. When asymmetric profiles are used the initiation of positive pitch control will turn the blades which in turn slow down of the rotation of the main shaft 1 until the substantial steady state is reached.

When the turbine is working in the positive pitch control mode, the end stop provided must be provided accordingly to the maximum/minimum allowable pitch angle the blade must be able to adjusted to.

In the embodiment of the present invention described above, two brakes 22a, 24 and 22b, 23 was provided the wind turbine. In an alternative embodiment the effect provided by the positive brake 22b, 23 may be provided by the pitch motor 11 by insertion of a friction clutch in the connection between the shaft of the motor 11 and the drive wheel 21 and utilising a motor which shaft is being substantially locked in angular position when not activated for rotation. The friction clutch will make it possible to rotate the synchronizing shaft 12 relatively to the main shaft 1 on the account of rotating the main shaft 1 once the negative brake 22a, 24 is activated.

Furthermore, in order to provide an even more fail safe system using the two brakes 22b, 23 and 22a, 24, the maximum torque of torsion the two brakes are able withstand may be made different. If this is the aim, it is normally preferred to use a stronger negative brake 22a, 24 and a weaker positive brake 22b, 23, i.e. the torque of torsion the negative brake is able to withstand is larger than the positive brake is able to withstand.

Figure 3:
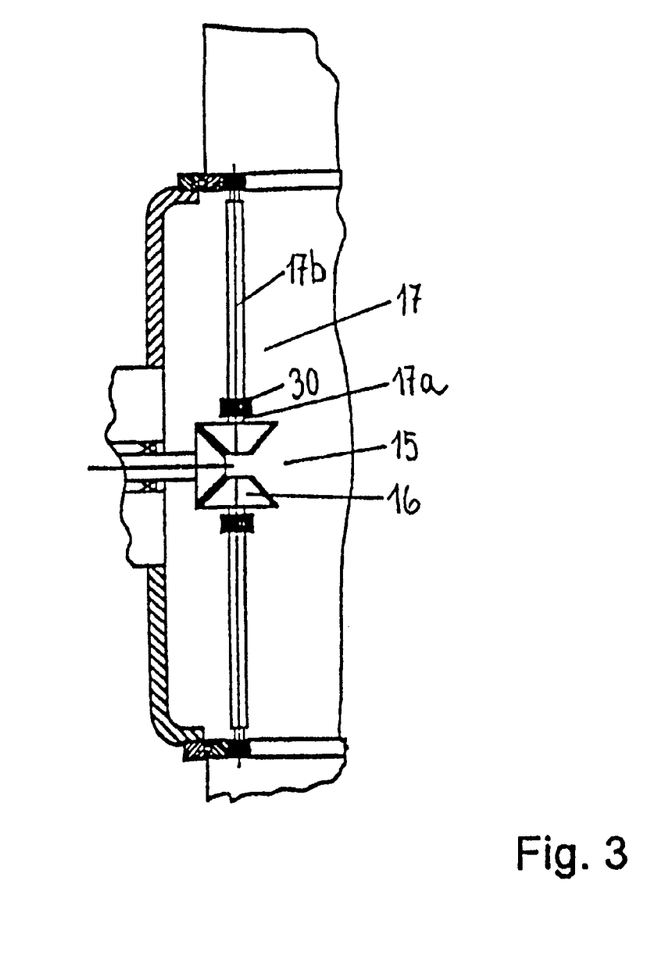
FIG. 3 shows an embodiment of the pitch controlling means according to the present invention having a friction clutch mounted.
Figure 4:
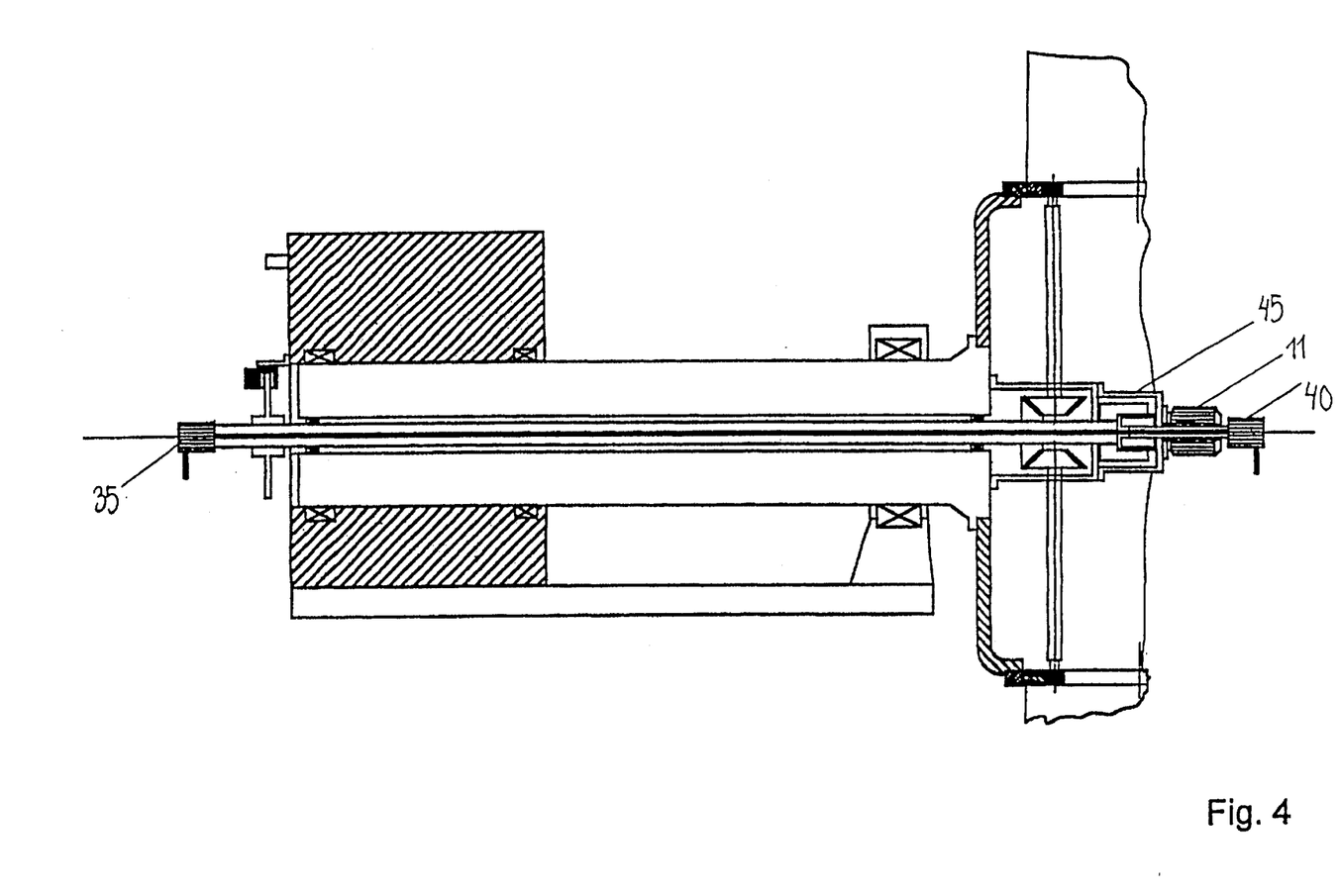
FIG. 4 shows an embodiment of the pitch controlling means according to the present invention in which the pitch control motor is situated in the front of the wind turbines main shaft.
Figure 5:
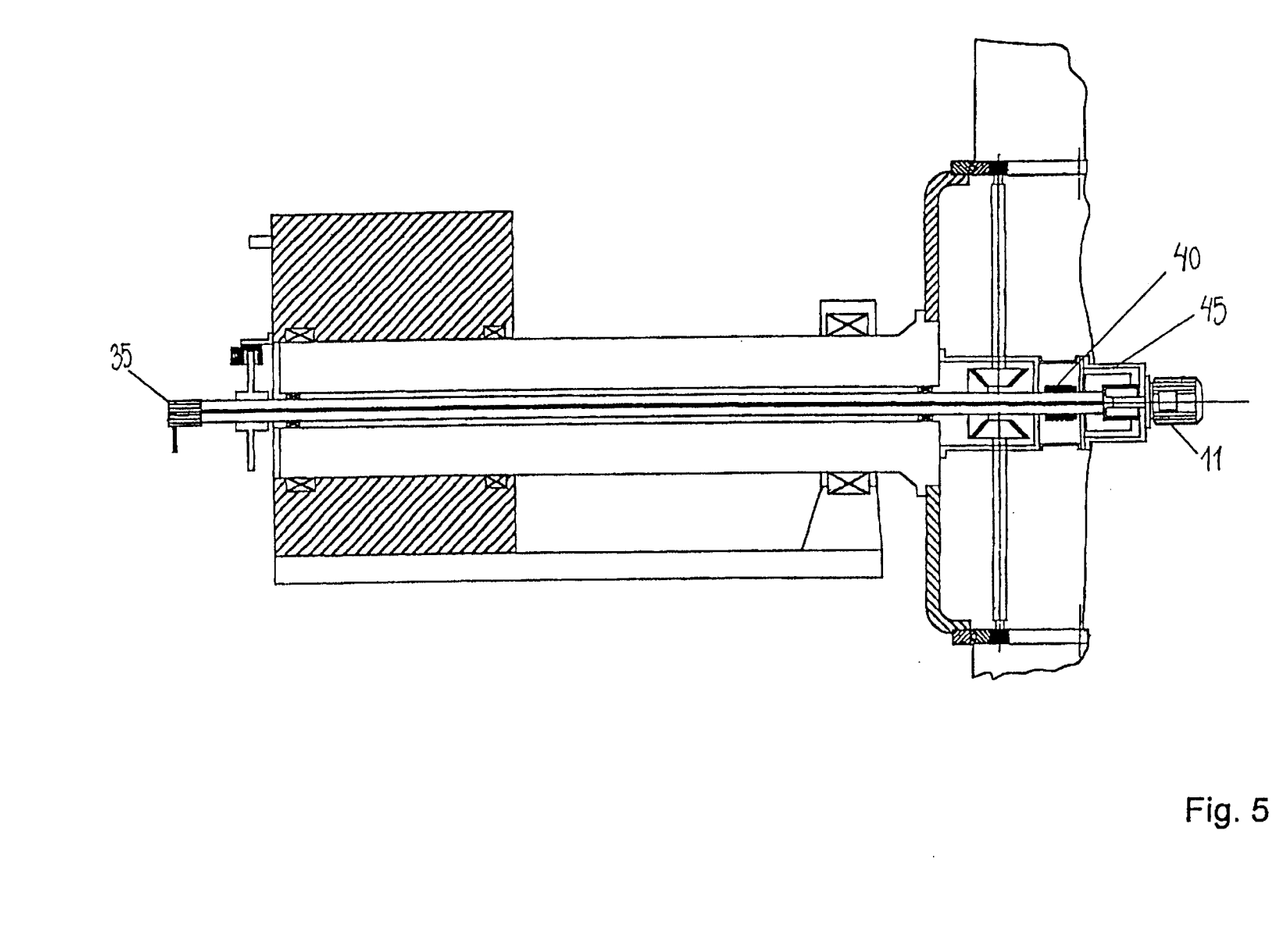
FIG. 5 shows an alternative embodiment of the pitch controlling means shown in FIG. 4.

In another a presently most preferred embodiment, as indicated in FIG. 4, of the present invention the pitch motor 11 together with the transmission comprised of the drive shaft 20, the drive wheel 21 and the gear wheel 13 is situated in the hub. The transmission may preferably mounted to the main shaft in the same manner as in the embodiments shown in FIGS. 1–3 but the drive shaft 20 may also advantageously be directly connected to the synchronizing shaft 12 eventually through a transmission 45 (referring to FIGS. 4 and 5).

In general a transmission between the shaft of pitch motor 11 and the synchronizing shaft 12 is preferred as the torque of torsion the motor has to overcome may become very large—in large turbine (2–3 Mw) the torque may become so large that the gear need is as high as 1 to 300. Suitable transmission are planet transmissions, cylinder transmissions, cyclo reducers or the like.

The transmission used for transferring a difference in rotational speed between the main shaft 1 and the synchronizing shaft 12 is in this embodiment a transmission similar to the one used for the embodiments depicted in FIG. 1 to 3, except from that the drive wheel 14 is now penetrated by the synchronizing shaft 12 as it has to proceed through the centre and to the end of the main shaft 1. In an actual design of the drive wheel it does not necessarily has to be penetrated, as this wheel may be an integral part of the synchronizing shaft 12.

In this presently most preferred embodiment of the present invention the negative brake 22a, 24 is situated at the rear of the main shaft 1 and the positive brake 22b, 23 may preferably be an integral part of the pitch motor 11 either as a separate brake or as the motor acting as a brake.

Transferring of power and control signal to and from the pitch motor is/are provided by the slip rings indicated in FIG. 4 and by the reference numeral 35 referring to a slip ring situated in the rear of the main shaft 1 and 40 referring to a slip ring situated in the front of the main shaft. As described above the control signal may also be transferred by telemetric so as to render superfluous the slip rings used for that purpose.

The invention is described above referring to specific embodiments of a wind turbine. The wind turbine of the embodiment shown has its main shaft parallel to the direction of the wind and its blades extending perpendicularly to the main shaft The wind turbine is basically an up-wind turbine, but may also be a down-wind turbine. Alternatively to using a gear in connection with the main shaft it will be possible to use a multipole generator using no gear. Furthermore other transmission solutions than those shown may be applied. It will be possible to use particularly the negative brake in other types of wind turbines. The positive brake and the negative brake of the embodiment shown are illustrated as disk brakes with a common brake disk. A brake disk may be used for each of the two brakes, and also other types of brakes than disk brakes may be used for both the positive brake and the negative brake. The equilibrium of the main shaft may be found at other pitch angles than those mentioned. That depends entirely on the type of wind turbine, the form and dimensions of the blade, and on the mechanical inertia of the wind turbine in question. Furthermore the actual values of pitch angles indicated in the description are not limitative but only mentioned as examples of given pitch angles. As discussed in the description, the actual values of the pitch angles at which optimal operational conditions can be achieved depend partly on the design of the blades and partly on the way in which they are mounted on the hub.

In FIG. 3 the pitch controlling means according to the present invention further comprises a friction clutch 30 mounted on at least one of the shafts 17. The purpose of these friction clutches is to assure a possibility to rotate at least one of the blades in case of one or blades are prevented from being rotated along its longitudinal axis, i.e. that if a blade is locked in pitch position then it will still be possible to rotate the remaining un-locked blades.

This is achieved by the friction clutch 30 being able to transmit a certain amount of torque applied to the shaft 17 through the bevel gear 15. When the torque applied to the friction clutch 30 exceed that maximum torque the clutch 30 are able to transmit, the inner part 17a of the shaft 17 will still be able to rotate whereas the outer part 17b of the shaft 17 will not rotate. Alternatively, the inner part 17a of the shaft 17 may be left out in case where friction clutch 30 is directly connected to the gear 15.

The friction clutch 30 is in a preferred embodiment two discs forced against each other along abutment surfaces of the discs for instance by use of springs. Layers enhancing friction typically coat the abutment surfaces.

In another preferred embodiment the friction clutch 30 is a clutch type wherein spring loaded ratchet co-operating with a toothed rim in such a way that the spring will force a ratchet into a groove defined by tooth's in the rim until the force acting on ratchet from the tooth and resulting from the torque applied exceed the force of the spring.

The use of the above-described clutches 30 may be applied in the cases where a controllable recovery of the mutual angular position of the two parts 17a, b of the shafts 17 is desirable. This situation could occur in cases where the reason for the blades being prevented from rotation along its longitudinal axis is for instance ice blocking the gear constituted by the gear wheel 18 and the pivot joint 19.

Such a recovery system my be comprised of means measuring the angular position of the two part 17a,b of the shaft 17 and retaining means for retaining the outer part 17b of the shaft 17 in a fixed position. As the outer part 17b is retained in a fixed position then a rotation of the inner part 17a of the shaft will change the mutual angular position of the two parts 17a,b of the shaft 17. By rotating the inner part 17a, retaining the outer part 17b and measuring the angular position of the two part 17a,b then the predetermined mutual angular of the two parts 17a,b will be recovered.

Alternatively, the friction clutch could be a connection means having a part which crack if the force applied to this part exceed a maximum force, whereby a connection between the gear 15 and the gear wheels 18 is no longer present As the torque needed to rotate a blade around its longitudinal axis is generally well defined or at least can be estimated the dimensioning of the friction clutches 30 can be chosen based on this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for controlling the pitch angle of a wind turbine blade of a wind turbine comprising:

a main shaft rotatably connected to a base part of the wind turbine, and at least one blade connected to the main shaft, the connection enables rotation of the blade about a longitudinal axis of the blade; and pitch angle altering means connected to the at least one blade for altering the pitch angle of said blade, and said pitch altering means comprising a bevel gear with a drive wheel being rotated by at least one synchronizing shaft and drive pinions for turning the at least one blade at an angle;

the at least one synchronizing shaft connecting activatable driving means with the pitch angle altering means, at least a part of the synchronizing shaft being aligned with and extends along or parallel with a central axis of the rotatably connected main shaft, so that upon activation of the driving means a difference in angular rotation between the synchronizing shaft and the rotatably connected main shaft is introduced, as the pitch angle altering means is adapted to convert the angular rotation difference into a rotation of the at least one blade along its longitudinal axis, whereby the pitch angle of the at least one blade is altered by activating the driving means, said pitch controlling device further having the entire activatable driving means mounted on the rotatably connected main shaft.

2. The pitch controlling device according to claim 1, wherein the pitch altering means comprises a bevel gear with a drive wheel being rotated by the synchronizing shaft and drive pinions for turning the at least one blade at an angle.

3. The pitch controlling device according to claim 1, wherein the entire activatable driving means is mounted on a rear part of the main shaft, the pitch altering means being located at a front end of the main shaft and the at least one synchronizing shaft extends from the rear end to the front end of the main shaft, the synchronizing shaft extends through the interior of the main shaft.

4. The pitch controlling device according to claim 1, wherein the entire activatable driving means is mounted on a front part of the main shaft, the pitch altering means being located at the front end of the main shaft and the at least one synchronizing shaft extends from the rear end to the front end of the main shaft, the synchronizing shaft extends through the interior of the main shaft.

5. The pitch controlling device according to claim 1, wherein the wind turbine comprises a multi-pole generator having a rotor constituting the main shaft of the wind turbine.

6. The pitch controlling device according to claim 1, wherein the wind turbine comprises a multi-pole generator being connected aligned with at the rear end of the wind turbine.

7. The pitch controlling device according to claim 1, wherein the at least one synchronizing shaft is provided with a part of a brake rotatable directly together with the synchronizing shaft and a part of the brake being non-rotatable with the synchronizing shaft being mounted on a stationary part of the chassis of the wind turbine.

8. The pitch controlling device according to claim 7, wherein the rotatable part of the brake is a brake caliper having a brake shoe mounted on the synchronizing shaft and the non-rotatable part of the brake is a brake ring mounted on the chassis.

9. The pitch controlling device according to claim 1, wherein the activatable driving means is a motor, and wherein the pitch altering means comprises preventing means for preventing the pitch altering means from converting the angular rotation difference into a rotation of one or more of the at least one blade when the torque needed to rotate the one or more blade(s) along its longitudinal axis exceed a predetermined torque.

10. The pitch controlling device according to claim 9, wherein electrical current to the activatable driving means is supplied by at least one slipring mounted concentrically with the main shaft and connected to a power supply.

11. The pitch controlling device according to claim 9, wherein the electrical current to the activatable driving means is supplied by power source contained in the main shaft or the main shaft being a part of the power source.

12. The pitch controlling device according to claim 9, wherein the motor is one of an electrical motor, a hydraulic driven motor and a pneumatic driven motor.

13. The pitch controlling device according to claim 1, wherein the at least one synchronizing shaft is provided with a part of a brake being mounted on and rotatable with the synchronizing shaft and a part of the brake being mounted on the main shaft and being non-rotatable with the synchronizing shaft.

14. The pitch controlling device according to claim 13, wherein the rotatable part of the brake is a brake disc and the non-rotatable part of the brake is a brake caliper having a brake shoe.

15. The patch controlling device according to claim 13, wherein the rotatable part of the brake is a brake caliper having a brake shoe mounted on the synchronizing shaft and the non-rotatable part of the brake is a brake ring mounted on the main shaft.

16. The pitch controlling device according to claim 13, wherein braking force is released by means of electric, hydraulic, mechanic or any other kind of applied dynamic force.

17. The pitch controlling device according to claim 13, wherein braking force is applied by springs or similar mechanically applied static force.

18. A method of controlling the pitch angle of a wind turbine, which method applies a device according to claim 1, and where the at least one synchronizing shaft and the activatable driving means are permanently connected, said method comprising the steps of:

activating the driving means and thereby instantly rotating the synchronizing shaft;

when activating the driving means introducing a difference in angular rotation between the synchronizing shaft and the main shaft;

transferring the difference in angular rotation between the synchronizing shaft and the main shaft to the pitch angle altering means; and de-activating the driving means and thereby instantly stopping the rotation of the synchronizing shaft.

19. The method according to claim 18, further comprising the step of retaining the angular position of the synchronizing shaft relative to the angular position of the main shaft.

20. The method according to claim 18, wherein the pitch angle is controlled so that the pitching of the blades is between +2° to −10°.

21. The method according to claim 18, wherein the pitch angle is controlled so that the pinching of the blades are between +1° to −5°.

22. The method for stopping the rotation of the blades of a wind turbine by applying the method according to claim 18 and where the at least one synchronizing shaft is provided with a rotatable part of a brake and a non-rotatable part of the brake being mounted on a stationary part of the chassis of the wind turbine, said stopping is provided by retaining the synchronizing shaft to a stationary part of the wind turbine.

23. The method of stopping the rotation of the blades of a wind turbine according to claim 22, wherein the angle which the main shaft is allowed to turn in either positive or negative direction when the synchronizing shaft is being retained to a stationary part of the wind turbine is given by pitching the blades between 0° to −20°.

24. The method of stopping the rotation of the blades of a wind turbine according to claim 22, wherein the angle which the main shaft is allowed to turn in either positive or negative direction when the synchronizing shaft is being retained to a stationary part of the wind turbine is given by pitching the blades between −10° to −15°.

25. The method of stopping the rotation of the blades of a wind turbine according to claim 22, wherein the main shaft is allowed to turn in either positive or negative direction when the synchronizing shaft is being retained to a stationary part of the wind turbine.

26. The method of stopping the rotation of the blades of a wind turbine by braking the main shaft of the wind turbine, according to claim 25, wherein the angle which the main shaft is allowed to turn in either positive or negative direction when the synchronizing shaft is being stopped is given by pitching the blades between −1° to +90° C.

27. The method of stopping the rotation of the blades of a wind turbine by braking the main shaft of the wind turbine according to claim 25, wherein the angle which the main shaft is allowed to turn in either positive or negative direction when the synchronizing shaft is being stopped is given by pitching the blades between 0° to 65°.

28. The method of stopping the rotation of the blades of a wind turbine by braking the main shaft of the wind turbine according to claim 25, wherein the angle which the main shaft is allowed to turn in either positive or negative direction when the synchronizing shaft is being stopped is given by pitching the blades between 0° to 40°.

* * * * *